United States Patent
Qing et al.

(10) Patent No.: US 12,526,894 B2
(45) Date of Patent: Jan. 13, 2026

(54) LED DRIVING CIRCUIT, LED POWERING CIRCUIT, AND LED LIGHTING DEVICE

(71) Applicant: SIGNIFY HOLDING B.V., Eindhoven (NL)

(72) Inventors: Shan Qing, Shanghai (CN); Guy Louis Paul De Bondt, Antwerpen (NL); Junwei Tian, Shanghai (CN); Dalibor Cvoric, Gelderland (NL); Morna Shen, Shanghai (CN); Hermanus Johannes Maria Vos, Waalre (NL); Frits Tobi De Jongh, Beek en Donk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/279,278

(22) PCT Filed: Mar. 7, 2022

(86) PCT No.: PCT/EP2022/055682
§ 371 (c)(1),
(2) Date: Aug. 29, 2023

(87) PCT Pub. No.: WO2022/189326
PCT Pub. Date: Sep. 15, 2022

(65) Prior Publication Data
US 2024/0121871 A1 Apr. 11, 2024

(30) Foreign Application Priority Data

Mar. 9, 2021 (WO) ................. PCT/CN2021/079758
Jul. 12, 2021 (EP) .................................. 21185094.6

(51) Int. Cl.
H05B 45/36 (2020.01)
H05B 45/59 (2022.01)
H05B 47/17 (2020.01)

(52) U.S. Cl.
CPC ............. *H05B 45/59* (2022.01); *H05B 47/17* (2020.01)

(58) Field of Classification Search
CPC ............................. H05B 45/59; H05B 47/17
See application file for complete search history.

(56) References Cited

U.S. PATENT DOCUMENTS

| 9,215,765 B1 | 12/2015 | Mokry et al. |
| 2013/0076245 A1 | 3/2013 | Phadke |

(Continued)

FOREIGN PATENT DOCUMENTS

| JP | 2009100639 A | 5/2009 |
| JP | 2012147521 A | 8/2012 |

(Continued)

*Primary Examiner* — Henry Luong

(57) ABSTRACT

In order to provide a balance between a fast start-up in start-up phase and a low light output ripple in normal operation phase, it is provided a LED driving circuit comprising: an input to receive a LED driving current, a buffer circuit adapted to buffer said LED driving current, and an output to be connected to LED and adapted to output the LED driving current, after buffered, to the LED, characterized in that, further comprises a buffer adjustment circuit adapted to adjust the buffer capability of the buffer circuit at a first level, in a start-up phase of the LED driving circuit when the LED driving circuit starts to receive said LED driving current, and adjust the buffer capability of the buffer circuit at a second level larger than the first level in a normal operation phase later than the start-up phase.

10 Claims, 3 Drawing Sheets

(56) References Cited

U.S. PATENT DOCUMENTS

| | | | |
|---|---|---|---|
| 2014/0346959 A1* | 11/2014 | Maiwald | H05B 47/10 315/185 R |
| 2020/0128635 A1 | 4/2020 | Wang et al. | |
| 2020/0205265 A1* | 6/2020 | Wang | H05B 45/36 |

FOREIGN PATENT DOCUMENTS

| | | |
|---|---|---|
| JP | 2013128372 A | 6/2013 |
| JP | 2019185540 A | 10/2019 |
| JP | 2020102444 A | 7/2020 |
| WO | 2012059853 A1 | 5/2012 |
| WO | 2013136301 A2 | 9/2013 |

* cited by examiner

LED DRIVING CIRCUIT, LED POWERING CIRCUIT, AND LED LIGHTING DEVICE

CROSS-REFERENCE TO PRIOR APPLICATIONS

This application is the U.S. National Phase application under 35 U.S.C. § 371 of International Application No. PCT/EP2022/055682, filed on Mar. 7, 2022, which claims the benefit of European Patent application Ser. No. 21/185, 094.6, filed on Jul. 12, 2021 and International Application No. PCT/CN2021/079758 filed Mar. 9, 2021. These applications are hereby incorporated by reference herein.

FIELD OF THE INVENTION

This invention relates to a LED driving circuit. In particular it relates to a LED driving circuit with both advantages of low flicker in normal operation and fast start-up.

BACKGROUND OF THE INVENTION

With the continuous update of the technical requirements of LED lighting products, in the new Single Lighting Regulation (SLR) standards released in Europe, there are clear requirements for the Stroboscopic Visibility Measure (SVM) to measure the light output ripple. It temporarily requires SVM<0.4, and the final version after consultation and revision may require SVM<0.9. This means the current to the LED should have much less ripple than now.

Traditionally the LED driving circuit has two stages, a first stage for power factor correction, PFC, whose output has large ripples, and a second stage to convert the output of the PFC stage into a smoother current so it can more or less solve the SVM requirement. However, a new trend is reducing the LED driving circuit into one stage or 1.5 stage, which has to implement PFC so its output to the LED still has considerable ripples. A further solution to make the ripple current acceptable is to increase significantly the capacitance of the output capacitor to smoothen the ripple. Such an output capacitor could be as large as hundreds of µF or even a thousand µF.

However, another problem rises with the large output capacitor. The larger the output capacitor, the longer the time it takes to charge the output capacitor to a voltage that is sufficient to turn on the LED. According to EU requirements, the start-up time of LED lighting products needs to be less than 0.5 s. If the LED lighting circuit is working in a dimming mode, and the power supply's output current is less than the maximum value, it takes quite a longer time to charge the large output capacitor before the LED starts to emit light, and this may not fulfill above requirement of the start-up time.

US2020205265A1 discloses providing a larger capacitance when the input voltage is 220V to 240V VAC and providing a smaller capacitance when the input volage is 100V to 120V VAC to meet requirement on harmonics.

WO2012059853A1 discloses a valley fill technology wherein a capacitor is switched in to be charged by the input voltage at the moment the input voltage is sufficient to drive the LED via a power converter, and the capacitor is discharged to power the LED when the input voltage drops thereby no energy can be drawn from the input voltage.

SUMMARY OF THE INVENTION

The embodiments of the invention aim to provide both low flicker and fast start-up. The basic idea of the embodiments of the invention is dynamically changing the buffer capability of the buffer circuit of the LED driving circuit, providing a relatively low buffer capability in start-up so the output voltage can be fast built up to turn on the LED; and then increasing the buffer capability in normal operation after the start up so as to smooth the ripple. Therefore, the start-up time is shortened and the flicker in normal operation is reduced.

According to a first aspect of the invention, a LED driving circuit is provided, which comprises: an input to receive a LED driving current, a buffer circuit adapted to buffer said LED driving current, and an output to be connected to an LED and adapted to output the LED driving current, after buffered, to the LED, characterized in that the LED driving circuit further comprises a buffer adjustment circuit adapted to adjust the buffer capability of the buffer circuit at a first level, in a start-up phase of the LED driving circuit when the LED driving circuit starts to receive said LED driving current, and adjust the buffer capability of the buffer circuit at a second level larger than the first level in a normal operation phase later than the start-up phase.

According to this aspect, since in the start-up phase the buffer capability is not so high, the buffer circuit builds up to a sufficient electrical level to turn on the LED, namely starting-up the LED quickly; after the start-up, the buffer capability is increased so as to absorb the ripple in the LED driving current and to meet the requirement of low flicker. This achieves a balance of fast start up and low flicker in normal operation for LED lighting.

In a detailed embodiment, the buffer circuit comprises at least one capacitor, and the buffer adjustment circuit is adapted to adjust an effective capacitance of the buffer circuit.

In this embodiment, by dynamically adjusting the effective capacitance, the time for the buffer circuit to build a voltage to turn on the LED is shortened, and its buffer capability is then increased to meet both requirement of fast start-up and low flicker.

In one embodiment, the start-up phase is a phase in which a voltage on the output and the at least one capacitor is being built and insufficient to turn on the LED, and the normal operation phase is a phase in which the voltage on the output and the at least one capacitor has been built up sufficient and turned on the LED, and the nominal light output ripple has been provided.

This embodiment further clarifies that the start-up phase is building the output voltage to reach the LED forward voltage before the LED can be turned on; and the normal operation phase is the phase where the output voltage has reached the LED forward voltage and the LED is turned on, and the nominal light output ripple has been provided.

In a detailed embodiment, the buffer circuit comprises a first capacitor and a second capacitor connected in parallel across the output, and the buffer adjustment circuit comprises a switch in series with the second capacitor across the output.

This embodiment gives a relatively simple circuit to provide an adjustable effective capacitance providing a first capacitor as a base capacitance and controlling how much is the involvement of a second capacitor via a switch.

In a further embodiment, the buffer adjustment circuit is adapted to connect the first capacitor across the output and disconnect the second capacitor from the output in the start-up phase, by opening the switch; and connect both of the first capacitor and the second capacitor across the output in the normal operation phase, by closing the switch.

This embodiment switches out the second capacitor in the start-up phase and let the first capacitor to build the LED forward voltage, so the start-up time is short; after start-up, this embodiment switches in the second capacitor to absorb ripple and reduce ripple.

In a further embodiment, in order to avoid a sudden switching in of the second capacitor and causing a large current sinking effect, the buffer adjustment circuit is adapted to make the switch operate in a current limiting mode to limit the current flowing through the second capacitor and the switch during a transition of connecting the second capacitor across the output, and make the switch operate in fully conduction mode in the normal operation mode.

This embodiment limits the current sinking by the second capacitor, and avoids a sudden drop of current to the LED and avoid dip/flicker in light output.

In an alternative embodiment, the buffer adjustment circuit further comprises an impedance in series with the second capacitor and in parallel with the switch.

Instead of switching the second capacitor, this alternative embodiment switches an extra impedance in series with the second capacitor so as to change a time response of the second capacitor.

Preferably, the buffer adjustment circuit is adapted to connect the first capacitor and a series connection of the second capacitor and the impedance across the output in the start-up phase, by opening the switch; and connect the first capacitor and the second capacitor across the output while bypassing the impedance in the normal operation phase, by closing the switch.

In this preferred embodiment, the second capacitor is also charged, though slowly, in the start-up phase, thus the second capacitor can smoothly transition into the normal operation phase without sinking much current from the first capacitor and the LED. This avoids a high visible light drop.

More specifically, the buffer adjustment circuit further comprises a bias circuit connected to a control terminal of the switch and adapted to apply a bias voltage to the control terminal to close the switch; a voltage detection circuit connected to the second capacitor, adapted to detect a signal indicative of the voltage on the second capacitor, and to disable the bias voltage when the voltage on the second capacitor is below a threshold; to enable the bias voltage when the voltage on the second capacitor is above the threshold.

This embodiment provides a detection on the charging of the second capacitor: if it is detected that the second capacitor is already charged sufficiently, the impedance can be bypassed, and the second capacitor can be used more efficiently without influencing the light output.

In a second aspect of the invention, a LED powering circuit is provided and comprising a power supply adapted to connect to a power source and converter an energy of the power source into the LED driving current, and the LED driving circuit of the first aspect.

This aspect provides a power electronic circuit as a whole, including the power supply function and the buffer function, with fast start-up and low flicker advantage. The LED powering circuit could be a standalone LED driver.

In a third aspect of the invention, a LED lighting device is provided, comprising LED and the LED powering circuit according to the second aspect.

This aspect provides a lighting device as a whole, including the LED and the LED powering circuit. The LED lighting device could be either a bulb, or a luminaire.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
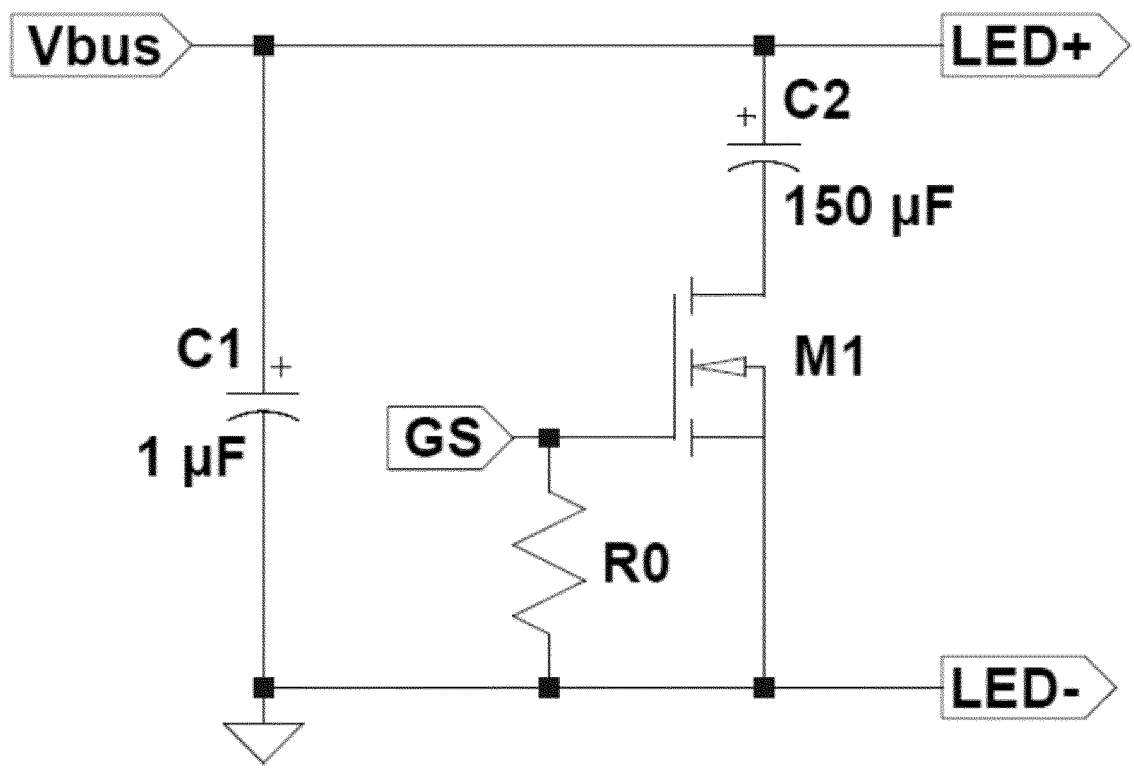
FIG. 1 shows a LED driving circuit according to one embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Figure 2:
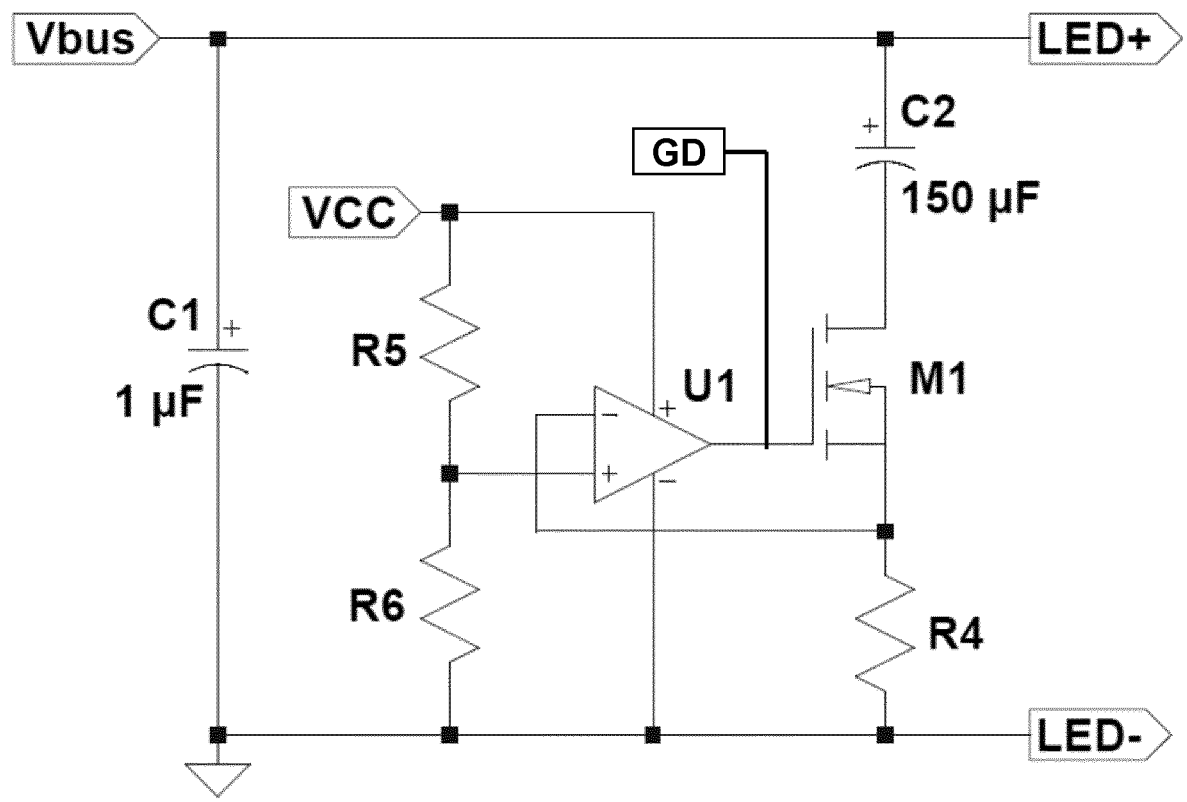
FIG. 2 shows an improvement of the embodiment shown in FIG. 1.
Figure 3:
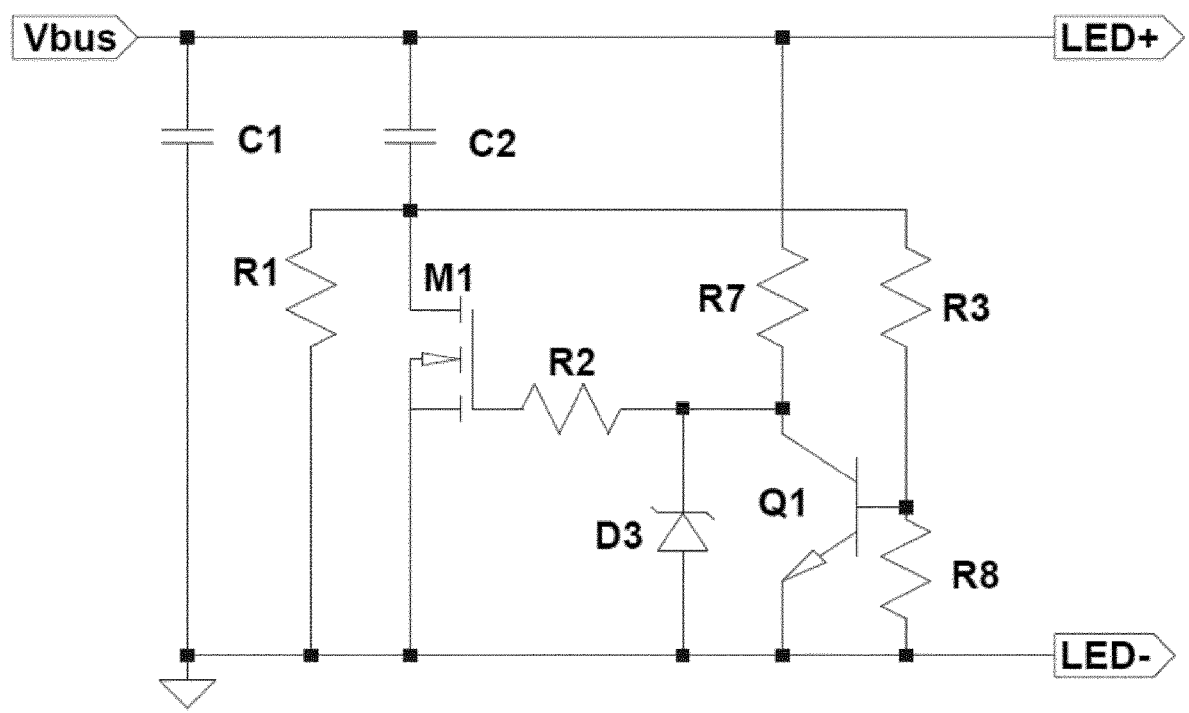
FIG. 3 shows another LED driving circuit according to another embodiment of the invention.

As shown in FIGS. 1, 2 and 3, embodiments of the invention propose a LED driving circuit comprising:

an input Vbus to receive a LED driving current, a buffer circuit C1 and C2 adapted to buffer said LED driving current, and an output LED+ and LED- to be connected to LED and adapted to output the LED driving current, after buffered, to the LED, characterized in that the LED driving circuit further comprises a buffer adjustment circuit including M1, among other components, adapted to adjust the buffer capability of the buffer circuit at a first level, in a start-up phase of the LED driving circuit when the LED driving circuit starts to receive said LED driving current, and adjust the buffer capability of the buffer circuit at a second level larger than the first level in a normal operation phase later than the start-up phase.

In a preferred embodiment, the buffer circuit is capacitive, and comprises at least one capacitor, and the buffer adjustment circuit is adapted to adjust an effective capacitance of the buffer circuit. Capacitive buffering is a widely used implementation in LED driving.

The start-up phase is a phase in which a voltage on the output and the at least one capacitor is being built up and insufficient to turn on the LED, and the normal operation phase is a phase in which the voltage on the output and the at least one capacitor has been built up sufficiently and turned on the LED and the nominal light output ripple has been provided. There could be a transition between the start-up phase and the normal operation phase, during which the capacitance is being adjusted. Below description will describe this.

In order to implement an adjustable capacitance, an easy topology is to provide two capacitors wherein one capacitor is associated with a switch to control the charging of that capacitor. More specifically, as shown in FIGS. 1 and 2, the buffer circuit comprises a first capacitor C1 and a second capacitor C2 and the buffer adjustment circuit. The buffer adjustment circuit comprises a switch M1 in series with the second capacitor C2 while the series connection of the second capacitor C2 and the switch M1 is across the output LED+ and LED−. Preferably, the series connection of the second capacitor C2 and the buffer adjustment circuit is placed in parallel with the first capacitor C1.

In the embodiment shown in FIG. 1, the LED driving current, from a power supply, flows in at the Vbus terminal. In order to change the effective capacitance of the two capacitors C1 and C2, the buffer adjustment circuit is adapted to allow the first capacitor C1 being connected across the output and disconnect the second capacitor C2 from the output or input in the start-up phase, by opening the switch M1 and connect both of the first capacitor C1 and the second capacitor C2 across the output in the normal operation phase, by closing the switch M1. The trigger of the switch M1 can originate from an established LED forward voltage, meaning that when the LED has been turned on, a current flows through the LED, the switch M1 closes and connects the second capacitor C2 to the Vbus terminal.

More specifically, the GS terminal may be tapped from a segment of LEDs whose forward voltage is preferably 5V or 10V. When the LED is on, this GS voltage is applied to the gate of the MOSFET M1 and closes the MOSFET M1. An optional resistor R0 is connected between the gate and source of the MOSFET M1 to protect the gate of the MOSFET M1 from an overvoltage. The resistance of the resistor R0 could be 47K Ohm.

Since the second capacitor may be empty when the switch M1 is to switch on, the second capacitor would intend to sink a large current from the LED driving current or even from the first capacitor C1, which may cause a dip in the LED driving current to the LED. In order to have a smooth connection of the second capacitor C2, in the improved embodiment shown in FIG. 2, the buffer adjustment circuit is adapted to make the switch M1 operate in a current limiting mode to limit the current flowing through the second capacitor C2 and the switch M1 during a transition of connecting the second capacitor C2 across the output. The limited current is preferably at an amplitude that it would not cause unacceptable light output drop. The real value can be designed by those skilled in the art according to practical needs.

In the embodiment in FIG. 2, the Vcc is used to provide a power supply to an op-amp U1 and retrieve a reference signal, via a voltage divider formed by the resistors R5 and R6, from the Vcc. The reference signal is connected to the positive input of the op-amp U1A. A small sensing resistor R4 is connected in series with the capacitor C2 to sense the charging current of C2, and the current is feedback to the negative input of the op-amp U1. In order to reduce power losses, the resistance of the sensing resistor R4 could be up to 10 Ohm. When the LED is on and the Vcc voltage is available, the op-amp is turned on and compares the sensed charging current and the reference, and outputs a signal to drive the MOSFET M1 in such a way that the charging current conforms to the reference. This a common way of a current source in controlling a current. An unshown detection circuit may detect that the second capacitor C2 is charged to substantially the LED forward voltage, or almost equal to the voltage on the first capacitor C1, and injects a high voltage gate driving signal GD to the gate of the MOSFET M1 to override the signal from the op-amp. The high voltage gate driving signal GD makes the switch M1 enter a fully conduction mode, not limiting the current flowing through the second capacitor C2 anymore. Then the two capacitors C1 and C2 are in substantially pure parallel connection with a large capacitance that is the sum of both capacitances.

The capacitance of C1 is 1 µF and the capacitance of C2 is 150 µF, as shown in the FIGS. 1 and 2, but this is only an example. Those skilled in the art are knowledgeable to select proper values according to the real requirement in start-up time and light output ripple.

In the above embodiment, the second capacitor is totally cut off from the output and not charged at all in the start-up phase. In an alternative embodiment, the LED driving circuit can allow the second capacitor also being charged but use a large impedance to limit its charging in the start-up phase, so it is still mainly the first capacitor C1 to be charged by the power supply and to build the LED forward voltage quickly. FIG. 3 shows this alternative embodiment. The buffer adjustment circuit further comprises an impedance R1 in series with the second capacitor C2 to limit the charging of the second capacitor C2, and the impedance R1 is in parallel with the switch M1.

The buffer adjustment circuit is adapted to connect the first capacitor C1 and a series connection of the second capacitor C2 and the impedance R1 across the output in the start-up phase, by opening the switch M1 and connect the first capacitor C1 and the second capacitor C2 across the output while bypassing the impedance R1 in the normal operation phase, by closing the switch M1. The buffer adjustment circuit further comprises a bias circuit R7, R2 connected to a control terminal of the switch M1 and adapted to apply a bias voltage to the control terminal to close the switch M1, and a voltage detection circuit including resistor R3, resistor R8 and switch Q1 connected to the second capacitor C2, adapted to detect a signal indicative of the voltage across the impedance R1. The voltage detection circuit R3, R8, Q1 enables the bias voltage when the voltage across the impedance R1 is below a threshold. This occurs for example when the charging current for the second capacitor C2, also flowing through the impedance R1, is too low, indicating that the second capacitor is charged enough. This allows the switch M1 to close and enter the normal operation mode. The voltage detection circuit R3, R8, Q1 disables the bias voltage when the voltage across the impedance R1 is above the threshold. This means that the current through the second capacitor C2 and the impedance R1 is high, indicating that the second capacitor C2 is still charging, and that therefore the switch M1 needs to remain open.

More specifically, referring to FIG. 3, the LED driving circuit circuitry includes the first capacitor C1 and the second capacitor C2, and M1, R2, D3, Q1, R7, R3, R8 and R1. Before the start-up phase, there is no electrical charge in this circuit. Both capacitors C1 and C2 are fully empty and their voltages are 0V, the MOSFET M1 is open and the transistor Q1 is also open since there is no voltage on both capacitors. The start-up phase begins once the power supply starts to output the LED driving current at the Vbus terminal, which will charge the output capacitors C1 and C2. C1 has no problem of being charged at a normal rate, but the capacitor C2 will be charged with a smaller current/low rate due to that the impedance R1, implemented by a resistor, is in series with the capacitor C2. R1 can be a fixed resistor (providing a fixed slow charging rate) or even a PTC resistor (providing a slower and slower charging rate as the PTC resistor becomes hot due to current flowing through it). When the capacitor C2 is still being charged, there is a charging current also flowing through the resistor R1, thus across the resistor R1 there will be a voltage VR1>0.7*(R3+R6)/R6, wherein the 0.7V is the close threshold of the transistor Q1, so that transistor Q1 is close via the voltage divider R3 and R6, the transistor Q1 shunts the gate of the MOSFET M1 to ground, and the MOSFET M1 remains open. The power supply is loaded mainly with the capacitor C1, and very slightly with the series connection of the capacitor C2 and the resistor R1. The LED driving current would go to the capacitor C1 by a large portion to charge it. Once the voltage on the capacitor C1 reaches the LED forward voltage, the LED starts to give light, though temporarily not giving the nominal low ripple. The start-up phase ends. In a transition phase between the start-up phase to the normal operation phase, the capacitor C2 is charged to the voltage of the capacitor C1 as well as the LED forward voltage, and it will stop substantially charging (except for absorbing the ripple which current is relatively small). The charging current of capacitor C2 decreases, so decreases the voltage on the resistor R1. The transistor Q1 becomes open if the voltage VR1 on the resistor R1 is <0.7*(R3+R6)/R6. Once the transistor Q1 is open, the MOSFET M1 will be closed via a bias voltage from the Vbus, provided by the bias circuit R4 connected to the Vbus, and optionally via R2. So the capacitor C2 is directly connected to the Vbus without the extra impedance R1. It had better be that to select proper values of those components and make the capacitor C2 is almost at the same level as the capacitor C1 when the MOSFET M1 is closed, to avoid a large current sinking by the capacitor C2, thereby avoiding a dip in the LED driving current to the LED and avoiding light output flicker. The two capacitors C1 and C2 are in parallel afterwards, and provide a large capacitance to absorb the ripple in the LED driving current, the nominal light output ripple has been provided, and the normal operation phase starts. After the MOSFET M1 is close, VR1=0 and the transistor Q1 remains open afterward. In this way the MOSFET M1 is always close and latched, as long as the power supply is still powered on and providing the LED driving current. The effective capacitance/buffer capability of the circuitry in the normal operation phase is higher than that in the start-up phase. The Zener diode D3 at the gate of the MOSFET M1 is to protect the gate of the MOSFET M1 from a too high voltage. The Zener diode D3 can be replaced by a resistor.

An advantage of the second embodiment is that the voltage detection circuit connects to the second capacitor, not to the LED directly, so it saves a wire to the LED board if the LED driving circuit is placed is a different board from the LED board, such as that the LED driving circuit is put in a standalone driver separate from the LED board.

The capacitance of the capacitor C1 could be 330 μF and the capacitance of the capacitor C2 could be 660 μF. The resistances of R1, R2, R3, R4 and R6 could be 150 Ohm, 22 Ohm, 100 K Ohm, 1000 K Ohm and 100 K Ohm respectively. Those values are all by way of example.

The above LED driving circuit can be a part of a standalone LED powering circuit such as an electronic power driver for LED. The LED powering circuit comprises a power supply adapted to connect to a power source, such as AC mains and output a LED driving current, and the LED driving circuit as discussed above.

The above LED powering circuit and a LED to be driven by the LED powering circuit can be combined together to form a standalone LED lighting device. The LED lighting device could be as small as a bulb, and as big as a luminaire.

The above embodiment uses capacitors to describe the buffering circuit, and the applicant submits that this is not the only choice. Alternatively, the buffer circuit can also be implemented in an inductive manner, since inductance is also capable of buffering the ripple in the LED driving current. More specifically, in the start-up phase the buffer circuit is adjusted by the buffer adjustment circuit with a smaller inductance to fast provide the driving current to the LED; and in the normal operation phase the buffer circuit adjusted by the buffer adjustment circuit with a larger inductance to buffer the ripple. Therefore, the way to dynamically change the inductance is similar as the above-mentioned way to dynamically change the capacitance, in terms of providing a fast start up in start-up phase and low ripple in normal operation phase are similar. Given description had described the invention mainly by taking capacitance buffering as example, those skilled in the art would implement the invention by inductive buffering and the application will not give detailed descriptions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A LED driving circuit comprising:
an input to receive a LED driving current,
a buffer circuit adapted to buffer said LED driving current, and
an output to be connected to LED and adapted to output the LED driving current to the LED,
wherein the LED driving circuit further comprises:
a buffer adjustment circuit (M1) adapted to:
adjust the buffer capability of the buffer circuit at a first level, in a start-up phase of the LED driving circuit wherein the start-up phase is a phase when the LED driving circuit starts to receive said LED driving current, and
adjust the buffer capability of the buffer circuit at a second level larger than the first level in a normal operation phase later than the start-up phase, and
wherein the buffer adjustment circuit is adapted to:
connect a first capacitor across the output and disconnect a second capacitor from the output in the start-up phase, by opening a switch; and
connect both of the first capacitor and the second capacitor across the output in the normal operation phase, by closing the switch.

2. The LED driving circuit according to claim 1, wherein the buffer circuit comprises at least one capacitor, and the buffer adjustment circuit is adapted to adjust an effective capacitance of the buffer circuit.

3. The LED driving circuit according to claim 2, wherein, the start-up phase is a phase in which a voltage on the output and the at least one capacitor is being built and insufficient to turn on the LED, and the normal operation phase is a phase in which the voltage on the output and the at least one capacitor has been built sufficient and turned on the LED, and the nominal light output ripple has been provided.

4. The LED driving circuit according to claim 3, wherein the buffer circuit comprises:
the first capacitor and the second capacitor connected in parallel across the output, and
the buffer adjustment circuit comprises the switch in series with the second capacitor across the output.

5. The LED driving circuit according to claim 1, wherein the buffer adjustment circuit is adapted to:
make the switch operate in a current limiting mode to limit the current flowing through the second capacitor and the switch during a transition of connecting the second capacitor across the output; and
make the switch operate in fully conduction mode in the normal operation mode.

6. The LED driving circuit according to claim 4, wherein the buffer adjustment circuit further comprises an impedance in series with the second capacitor and in parallel with the switch.

7. The LED driving circuit according to claim 6, wherein the buffer adjustment circuit is adapted to:

connect the first capacitor and a series connection of the second capacitor and the impedance across the output in the start-up phase, by opening the switch; and
connect the first capacitor and the second capacitor across the output while bypassing the impedance in the normal operation phase, by closing the switch.

8. The LED driving circuit according to claim 6, wherein the buffer adjustment circuit further comprises:
a bias circuit connected to a control terminal of the switch and adapted to apply a bias voltage to the control terminal to close the switch; and
a voltage detection circuit connected to the second capacitor, adapted to detect a signal indicative of the voltage on the second capacitor, and
to disable the bias voltage when the voltage on the second capacitor is below a threshold; and
to enable the bias voltage when the voltage on the second capacitor is above the threshold.

9. A LED powering circuit comprising:
a power supply adapted to connect to a power source, and convert an energy of the power source into the LED driving current; and
the LED driving circuit according to claim 1.

10. A LED lighting device, comprising:
LED; and
the LED powering circuit according to claim 9.

* * * * *